(12) United States Patent
Zhuge et al.

(10) Patent No.: US 12,062,116 B2
(45) Date of Patent: Aug. 13, 2024

(54) IMAGE PROCESSING METHOD AND APPARATUS, READABLE MEDIUM AND ELECTRONIC DEVICE

(71) Applicant: BEIJING BYTEDANCE NETWORK TECHNOLOGY CO., LTD., Beijing (CN)

(72) Inventors: Jingjing Zhuge, Beijing (CN); Xu Fan, Beijing (CN); Ye Chen, Beijing (CN); Shupeng Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 249 days.

(21) Appl. No.: 17/782,985

(22) PCT Filed: Nov. 3, 2020

(86) PCT No.: PCT/CN2020/126255
§ 371 (c)(1),
(2) Date: Jun. 6, 2022

(87) PCT Pub. No.: WO2021/139372
PCT Pub. Date: Jul. 15, 2021

(65) Prior Publication Data
US 2023/0005194 A1 Jan. 5, 2023

(30) Foreign Application Priority Data
Jan. 6, 2020 (CN) .......................... 202010010816.8

(51) Int. Cl.
*G06T 11/00* (2006.01)
*G06T 7/13* (2017.01)
(52) U.S. Cl.
CPC .............. *G06T 11/001* (2013.01); *G06T 7/13* (2017.01)

(58) Field of Classification Search
None
See application file for complete search history.

(56) References Cited

U.S. PATENT DOCUMENTS

| 7,656,408 B1* | 2/2010 | Brandt | G06T 13/80 382/199 |
| 2008/0030504 A1* | 2/2008 | Brunner | G06T 15/00 345/473 |

(Continued)

FOREIGN PATENT DOCUMENTS

| CN | 104268918 A | 1/2015 |
| CN | 105654531 A | 6/2016 |

(Continued)

OTHER PUBLICATIONS

John P. Collomosse, David Rowntree, Peter M. Hall, "Stroke Surfaces: Temporally Coherent Artistic Animations from Video", Sep. 2005, IEEE, IEEE Transactions on Visualization and Computer Graphics, vol. 11, No. 5, pp. 540-549.*

(Continued)

*Primary Examiner* — Robert Bader
(74) *Attorney, Agent, or Firm* — BakerHostetler

(57) ABSTRACT

An image processing method includes: recognizing a target contour of a target object in a target image collected at a current moment determining, in the target contour, a starting contour point corresponding to a starting contour position, a final contour point corresponding to a final contour position, and a split contour point corresponding to the current moment taking a line segment composed of contour points between the starting contour point and the split contour point in the target contour as a first line segment, and taking a line segment except the first line segment in the target contour as a second line segment rendering the first line segment (Continued)

according to a first color, and rendering the second line segment according to a second color.

12 Claims, 8 Drawing Sheets

(56) References Cited

U.S. PATENT DOCUMENTS

| | | | |
|---|---|---|---|
| 2018/0211400 A1 | 7/2018 | Park et al. | |
| 2019/0197744 A1 | 6/2019 | Hou et al. | |

FOREIGN PATENT DOCUMENTS

| | | | |
|---|---|---|---|
| CN | 107123077 A | 9/2017 | |
| CN | 108805957 A | 11/2018 | |
| CN | 110058685 A | 7/2019 | |
| CN | 110288670 A | 9/2019 | |
| CN | 110610453 A | 12/2019 | |
| CN | 111210485 A | 5/2020 | |

OTHER PUBLICATIONS

Wenbin Li, Fabio Viola, Jonathan Starck, Gabriel J. Brostow, Neill D. F. Campbell, "Roto++: Accelerating Professional Rotoscoping using Shape Manifolds", Jul. 11, 2016, ACM, ACM Transactions on Graphics, vol. 35, Issue 4, Article No. 62, pp. 1-15.*
Yin Li, Jian Sun, Heung-Yeung Shum, "Video Object Cut and Paste", Jul. 1, 2005, ACM, SIGGRAPH '05: ACM SIGGRAPH 2005 Papers, pp. 595-600.*
Jue Wang, Pravin Bhat, R. Alex Colburn, Maneesh Agrawala, Michael F. Cohen, "Interactive Video Cutout", Jul. 1, 2005, ACM, ACM Transactions on Graphics, vol. 24, Issue 3, pp. 585-594.*
International Patent Application No. PCT/CN2020/126255; Int'l Search Report; dated Feb. 5, 2021; 2 pages.

* cited by examiner

IMAGE PROCESSING METHOD AND APPARATUS, READABLE MEDIUM AND ELECTRONIC DEVICE

This application is the national phase application of PCT International Patent Application No. PCT/CN2020/126255, filed on Nov. 3, 2020, which claims priority of the Chinese patent application entitled "Image Processing Method and Apparatus, Readable Medium and Electronic Device" filed with the Patent Office of China on Jan. 6, 2020, with the Application No. 202010010816.8, the disclosure of which is incorporated herein by reference in their entireties.

TECHNICAL FIELD

The present disclosure relates to a field of image processing technologies, and more particularly, to an image processing method, an apparatus, a readable medium, and an electronic device.

BACKGROUND

With continuous development of terminal technology and image processing technology, image processing operations that may be provided on a terminal device are more and more diverse. For example, the terminal device may identify a contour of a specified object (e.g., a person, a cat, a dog, etc.) in an image; a mode of identifying the contour is relatively fixed, and the contour of the object may only be displayed according to a prescribed color or rule. With respect to multi-frame images included in a video, a state of an object in each frame of image may change, but the contour of the object is always displayed in a same mode in each frame of image, which cannot be associated with the dynamically changing object and cannot meet users' needs.

SUMMARY

An objective of the present disclosure is to provide an image processing method, an apparatus, a readable medium, and an electronic device, for solving the problem that the existing image processing method has a relatively fixed mode of identifying the contour, and can only display the contour of an object according to a prescribed color or rule, resulting in a technical problem that cannot be associated with the dynamically changing object and cannot meet users' needs.

In a first aspect, the present disclosure provides an image processing method, the method comprises:
  recognizing a target contour of a target object in a target image collected at a current moment, the target contour comprises a plurality of contour points;
  determining, in the target contour, a starting contour point corresponding to a starting contour position, a final contour point corresponding to a final contour position, and a split contour point corresponding to the current moment, according to a time difference between the current moment and a first moment, and according to the starting contour position and the final contour position determined at the first moment, the first moment is a moment before the current moment;
  taking a line segment composed of contour points between the starting contour point and the split contour point in the target contour as a first line segment, and taking a line segment except the first line segment in the target contour as a second line segment;
  rendering the first line segment according to a first color, and rendering the second line segment according to a second color, the first color is different from the second color; and
  repeatedly executing a step of recognizing a target contour of a target object in the target image collected at a current moment, to a step of rendering a first line segment according to the first color, and rendering a second line segment according to the second color, until a line segment composed of contour points between the starting contour point and the final contour point in the target contour is rendered into the first color.

In a second aspect, the present disclosure provides an image processing apparatus, the apparatus comprises:
  a recognizing module, configured to recognize a target contour of a target object in a target image collected at a current moment, the target contour comprises a plurality of contour points;
  a first determining module, configured to determine, in the target contour, a starting contour point corresponding to a starting contour position, a final contour point corresponding to a final contour position, and a split contour point corresponding to the current moment, according to a time difference between the current moment and a first moment, and according to the starting contour position and the final contour position determined at the first moment, the first moment is a moment before the current moment;
  a second determining module, configured to take a line segment composed of contour points between the starting contour point and the split contour point in the target contour as a first line segment, and take a line segment except the first line segment in the target contour as a second line segment; and
  a rendering module, configured to render the first line segment according to a first color, and render the second line segment according to a second color, the first color is different from the second color;
  repeatedly executing a step of recognizing a target contour of a target object in a target image collected at a current moment, to a step of rendering a first line segment according to the first color, and rendering a second line segment according to the second color, until a line segment composed of the contour points between the starting contour point and the final contour point in the target contour is rendered into the first color.

In a third aspect, the present disclosure provides a computer-readable medium, on which a computer program is stored. The program, when executed by a processing apparatus, implements steps of the method described in the first aspect of the present disclosure.

In a fourth aspect, the present disclosure provides an electronic device, which comprises:
  a storage apparatus, on which a computer program is stored;
  a processing apparatus, configured to execute the computer program in the storage apparatus, to implement steps of the method described in the first aspect of the present disclosure.

Through the above-described technical solution, the present disclosure firstly recognizes a target contour of a target object from a target image collected at a current moment; then according to a time difference between the current moment and a first moment, determines a starting contour point corresponding to a starting contour position, a final contour point corresponding to a final contour position, and a split contour point corresponding to the current moment in the target contour; then takes a line segment composed of contour points between the starting contour point and the split contour point as a first line segment, and takes a line segment except the first line segment in the target contour as a second line segment; finally renders the first line segment according to a first color, and renders the second line segment according to a second color. The above-described steps are repeatedly executed until the line segment composed of contour points between the starting contour point and the final contour point is rendered into the first color. The present disclosure can implement an effect of dynamic stroke on the contour of the target object, within a certain range indicated by the starting contour position and the final contour position.

Other features and advantages of the present disclosure will be described in detail in the detailed description that follows.

BRIEF DESCRIPTION OF THE DRAWINGS

The above and other features, advantages and aspects of various embodiments of the present disclosure will become more apparent when taken in conjunction with the accompanying drawings and with reference to the following detailed implements. Throughout the drawings, the same or similar reference numbers refer to the same or similar elements. It should be understood that the drawings are schematic and that the components and elements are not necessarily drawn to scale. In the accompanying drawings.

DETAILED DESCRIPTION

Figure 1:
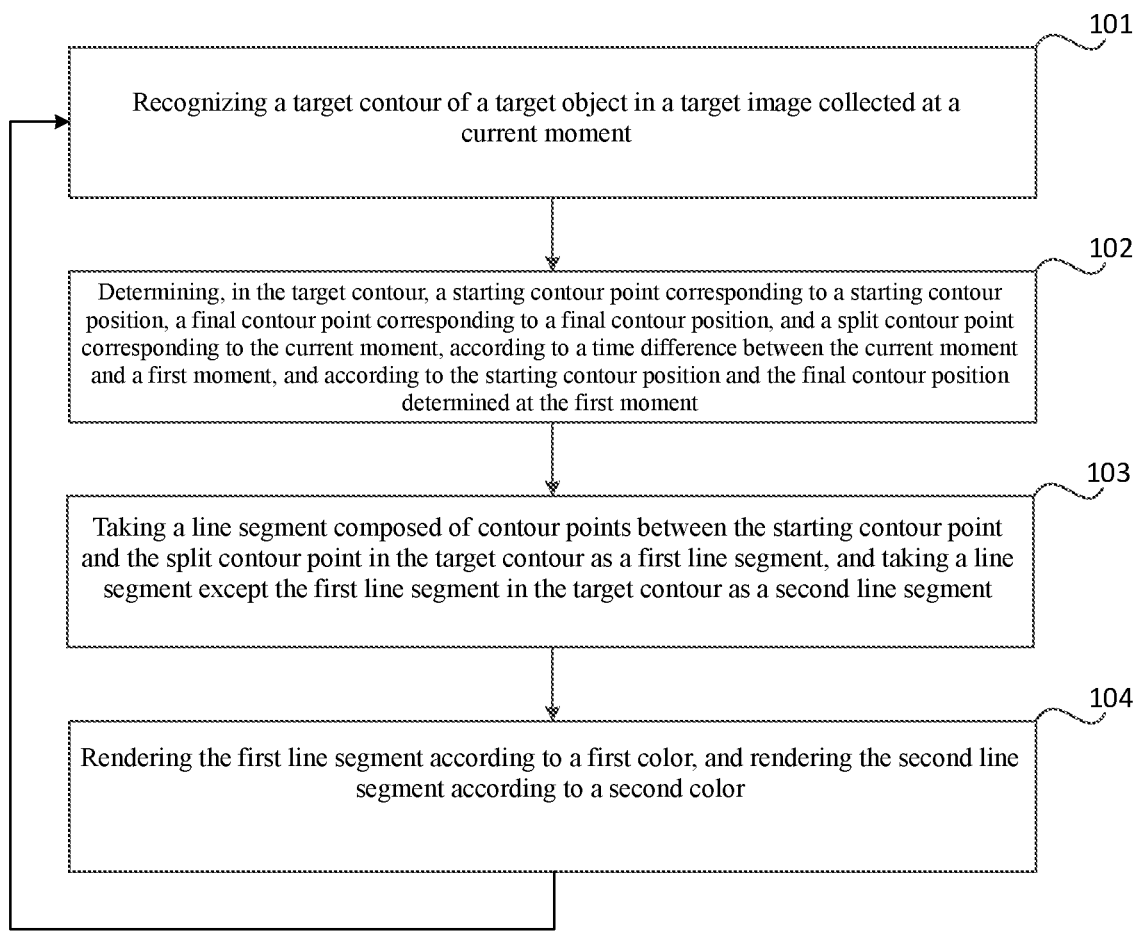
FIG. 1 is a flow chart of an image processing method shown according to an exemplary embodiment.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes, and are not intended to limit the protection scope of the present disclosure.

It should be understood that the various steps described in the method embodiments of the present disclosure may be executed in different orders and/or in parallel. Furthermore, method embodiments may include additional steps and/or omitting executing the illustrated steps. The scope of the present disclosure is not limited in this regard.

As used herein, the terms "comprise" "include" and variations thereof are open-ended inclusions, i.e., "comprise but not limited to". The term "based on" is "based at least in part on." The term "one embodiment" means "at least one embodiment"; the term "another embodiment" means "at least one additional embodiment"; the term "some embodiments" means "at least some embodiments". Relevant definitions of other terms will be given in the description below.

It should be noted that concepts such as "first", "second", etc. mentioned in the present disclosure are only used to distinguish different devices, modules or units, and are not used to limit the order of functions performed by these devices, modules or units or interdependence relationship.

It should be noted that the modifications of "a" and "a plurality" mentioned in the present disclosure are illustrative rather than restrictive, and those skilled in the art should understand that unless the context clearly indicates otherwise, they should be understood as "one or more".

The names of messages or information exchanged between a plurality of devices in the embodiments of the present disclosure are only for illustrative purposes, and are not intended to limit the scope of these messages or information.

FIG. 1 is a flow chart of an image processing method shown according to an exemplary embodiment; as shown in FIG. 1, the method includes:

Step 101: recognizing a target contour of a target object in a target image collected at a current moment, the target contour includes a plurality of contour points.

Figure 2:
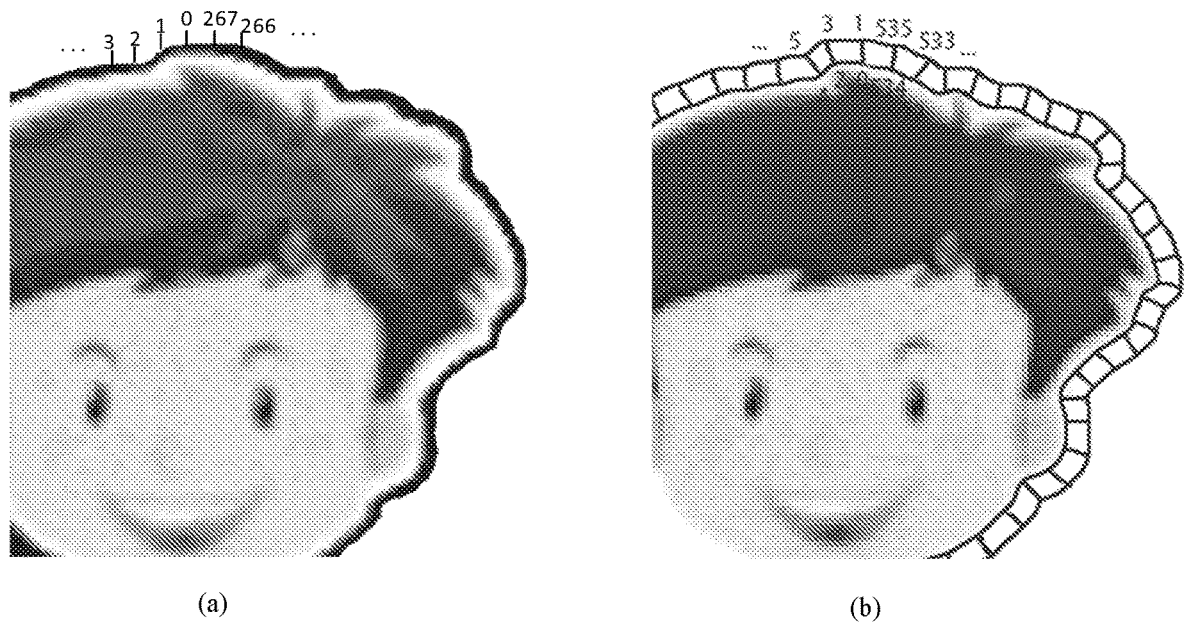
FIG. 2 is a schematic diagram of a target contour shown according to an exemplary embodiment.

For example, the target image collected at the current moment may be, for example, a frame of image containing the target object collected at the current moment in a video shot by a user through a terminal device, or may also be a frame of image containing the target object at the current moment in a video played by the user on a display interface of the terminal device. The target object may be specified by the user, or may also be a preset object on the terminal device, for example, may be a living object such as a person, a cat, a dog, etc., or may also be any kind of object such as a doll, a robot, a car, a computer, a table and a chair, etc. Firstly, the target contour of the target object in the target image may be recognized according to a preset recognition algorithm; and the target contour includes a plurality of contour points. The contour point may be understood as an endpoint of each segment among a plurality of segments generated by dividing the target contour indicating the target object according to a preset interval; each contour point has a serial number; and the serial number is used to indicate an order of the contour point in the target contour. For example, the recognition algorithm may be any kind of image matting algorithm; and the target contour output by the recognition algorithm may have various representation forms. For example, the target contour may be a line segment (line segments connected end to end) that can represent the target contour, as shown in (a) of FIG. 2; then the target contour is divided into a plurality of line segments according to a preset interval; and an endpoint between each line segment is a contour point, that is, the contour points marked by serial numbers 0, 1, 2, 3, . . . , 267 in (a) of FIG. 2. The target contour may also be a region that can represent the target contour (which may be understood as a middle region between two line segments of an inner contour and an outer contour of the target object), as shown in (b) of FIG. 2, then the target contour is divided into a plurality of rectangular regions according to a preset interval; and four vertices of each rectangular region are contour points, that is, the contour points marked by serial numbers 0, 1, 2, 3, . . . , 535 in (b) of FIG. 2, where 0, 1, 2, 3 form a rectangular region, and so on. The following embodiments are described by taking the target contour shown in (a) of FIG. 2 as an example, which will not be limited in the present disclosure.

Step 102: determining, in the target contour, a starting contour point corresponding to a starting contour position, a final contour point corresponding to a final contour position, and a split contour point corresponding to the current moment, according to a time difference between the current moment and a first moment, and according to the starting contour position and the final contour position determined at the first moment, the first moment is a moment before the current moment.

For example, at the first moment (the moment before the current moment), the terminal device collects an initial image; the user may input a setting instruction through the terminal device; and the setting instruction may include a starting key point and a final key point set by the user, or may also include a first color set by the user. The starting key point and the final key point are used to identify a region range that needs to be stroked in the initial image; and the first color is used to indicate a color that needs to be rendered in the region range that needs to be stroked. Before the first moment, a display color of the target contour may be a second color. For example, the target object is a person; in the setting instruction, the starting key point is head top, the final key point is left hand; the first color is purple; and before that, the contour of the person is green (i.e., the second color). Then a dynamic stroke effect that needs to be achieved is: rendering the head to the left hand (which may be from the head to the left hand in a clockwise direction, or may also be from the head to the left hand in a counter-clockwise direction) into purple, and rendering other portion in the target contour into green.

At the first moment, the starting contour position corresponding to the starting key point and the final contour position corresponding to the final key point may be determined according to correspondence between different key points and contour points. The contour position (including: the starting contour position, the final contour position and the split contour position as mentioned later) may be understood as a position that can reflect a position of a contour point in the entire contour (including the target contour and the initial state contour as mentioned later). Since states such as posture, distance, etc. of the target object in images collected at different moments will change, and the corresponding contour contain different numbers of contour points; since it is impossible to accurately describe specified portions of the target object only by using the serial numbers of the contour points, a ratio of the serial number of the contour point to the number of contour points contained in the contour may be used as the contour position. For example, a serial number of a contour point is 20, and the number of contour points is 500, then the contour position may be 0.04. Then, at the current moment, according to the contour position (including the starting contour position and the final contour position) and the number of contour points contained in the target contour, the corresponding starting contour point and final contour point are determined. The starting contour point is a contour point corresponding to the starting key point in the target image; and similarly, the final contour point is a contour point corresponding to the final key point in the target image.

Further, in a process of implementing dynamic stroke, a rendering duration of dynamic stroke may also be set, which may be set by the user at the first moment, or may also be a default value preset in the terminal device. The rendering duration may be understood as a duration required to gradually render the line segment between the starting key point and the final key point into the first color from the starting key point to the final key point, or may also be understood as the number of frames of image required to gradually render the line segment between the starting key point and the final key point into the first color. Therefore, the split contour point corresponding to the current moment may be determined according to the time difference between the current moment and the first moment (or the number of frames between the target image and the initial image); the split contour point may be understood as that, at the current moment, the line segment between the starting contour point and the split contour point needs to be rendered into the first color, and the other contour points need to be rendered into the second color.

Step 103: taking a line segment composed of contour points between the starting contour point and the split contour point in the target contour as a first line segment, and taking a line segment except the first line segment in the target contour as a second line segment.

Step 104: rendering the first line segment according to the first color, and rendering the second line segment according to the second color, the first color is different from the second color.

For example, after the starting contour point and the split contour point are determined, the target contour may be divided into the first line segment and the second line segment according to the starting contour point and the split contour point. The first line segment is a line segment composed of contour points from the starting contour point to the split contour point in a preset direction (e.g., a clockwise direction or a counterclockwise direction); and the second line segment is a line segment except the first line segment in the target contour. Finally, the first line segment is rendered according to the first color, and the second line segment is rendered according to the second color.

Steps 101 to 104 are repeatedly executed until, in the target contour, the line segment composed of contour points between the starting contour point and the final contour point is rendered into the first color.

Taking the rendering duration of 5 seconds as an example, if the serial number of the starting contour point is 1, and the serial number of the final contour point is 100, there are 100 contour points between the starting contour point and the final contour point. It takes 5 seconds to gradually render the line segment composed of these 100 contour points into the first color, then, at the 1st second, contour points 1 to 20 are rendered according to the first color; and at the 2nd second, contour points 1 to 40 are rendered according to the first color, and so on, until the 5th second, contour points 1 to 100 (i.e., all contour points between the starting contour point and the final contour point) are rendered according to the first color to implement the effect of dynamic stroke.

Or, taking the rendering duration as 100 frames as an example, if the serial number of the starting contour point is 1, and the serial number of the final contour point is 100, there are 100 contour points between the starting contour point and the final contour point. It takes 100 frames to gradually render the line segment composed of these 100 contour points into the first color, then, at the 1st frame, contour points 1 to 2 are rendered according to the first color, and at the 2nd frame, contour points 1 to 3 are rendered according to the first color, and so on, until the 100th frame, contour points 1 to 100 (i.e., all contour points between the starting contour point and the final contour point) are rendered according to the first color to implement the effect of dynamic stroke.

It should be noted that, after the first line segment is rendered according to the first color and the second line segment is rendered according to the second color, different operations may be performed on the target image according to different needs of the user, for example, the target image may be displayed on the display interface of the terminal device, or the target image may also be stored in a specified storage path, or the target image may also be sent to a specified server for sharing, which will not be specifically limited in the present disclosure.

To sum up, the present disclosure firstly recognizes a target contour of a target object from a target image collected at a current moment; then according to a time difference between the current moment and a first moment, determines a starting contour point corresponding to a starting contour position, a final contour point corresponding to a final contour position, and a split contour point corresponding to the current moment in the target contour; then takes a line segment composed of contour points between the starting contour point and the split contour point as a first line segment, and takes a line segment except the first line segment in the target contour as a second line segment; finally renders the first line segment according to a first color, and renders the second line segment according to a second color. The above-described steps are repeatedly executed until the line segment composed of the contour points between the starting contour point and the final contour point is rendered into the first color. The present disclosure can implement an effect of dynamic stroke on the contour of the target object, within a certain range indicated by the starting contour position and the final contour position.

Figure 3:
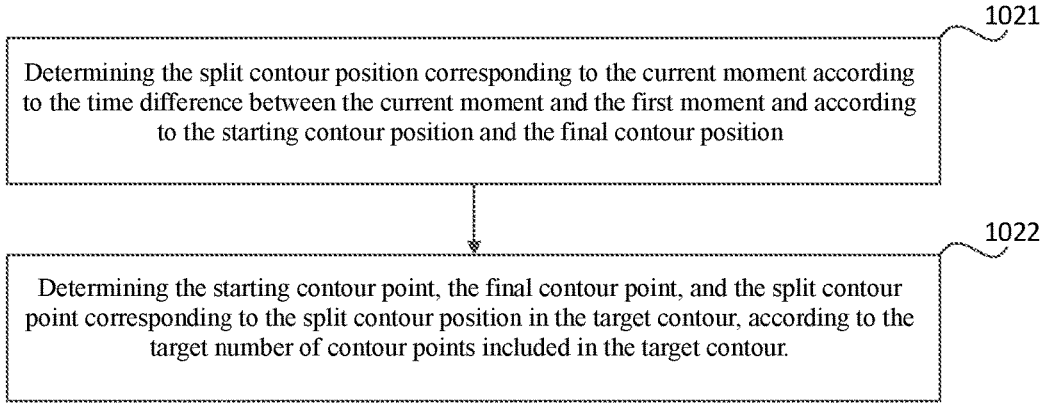
FIG. 3 is a flow chart of another image processing method shown according to an exemplary embodiment.

FIG. 3 is a flow chart of another image processing method shown according to an exemplary embodiment; as shown in FIG. 3, step 102 includes:

Step 1021: determining the split contour position corresponding to the current moment according to the time difference between the current moment and the first moment and according to the starting contour position and the final contour position.

Step 1022: determining the starting contour point, the final contour point, and the split contour point corresponding to the split contour position in the target contour, according to a target number of contour points included in the target contour.

For example, the split contour position corresponding to the current moment may be determined firstly according to the time difference between the current moment and the first moment (or the number of frames between the target image and the initial image). The split contour position is used to indicate which portion of the line segment indicated by the starting contour position and the final contour position needs to be rendered into the first color at the current moment, that is, the line segment indicated by the starting contour position to the split contour position is rendered into the first color.

Split contour position=starting contour position+
(final contour position−starting contour position)*(time difference/rendering duration).

Taking the starting contour position as 0.2 and the final contour position as 0.4 as an example, the rendering duration is 5 seconds, and the time difference between the current moment and the first moment is 2 seconds, then the split contour position is 0.2+(0.4−0.2)*(2/5)=0.28. The target number of contour points included in the target contour is 700, then the serial number of the starting contour point in the target contour is 0.2*700=140, that is, the 140th contour point; the serial number of the split contour point in the target contour is 0.28*700=196; and the serial number of the final contour point in the target contour is 0.4*700=280.

Figure 4:
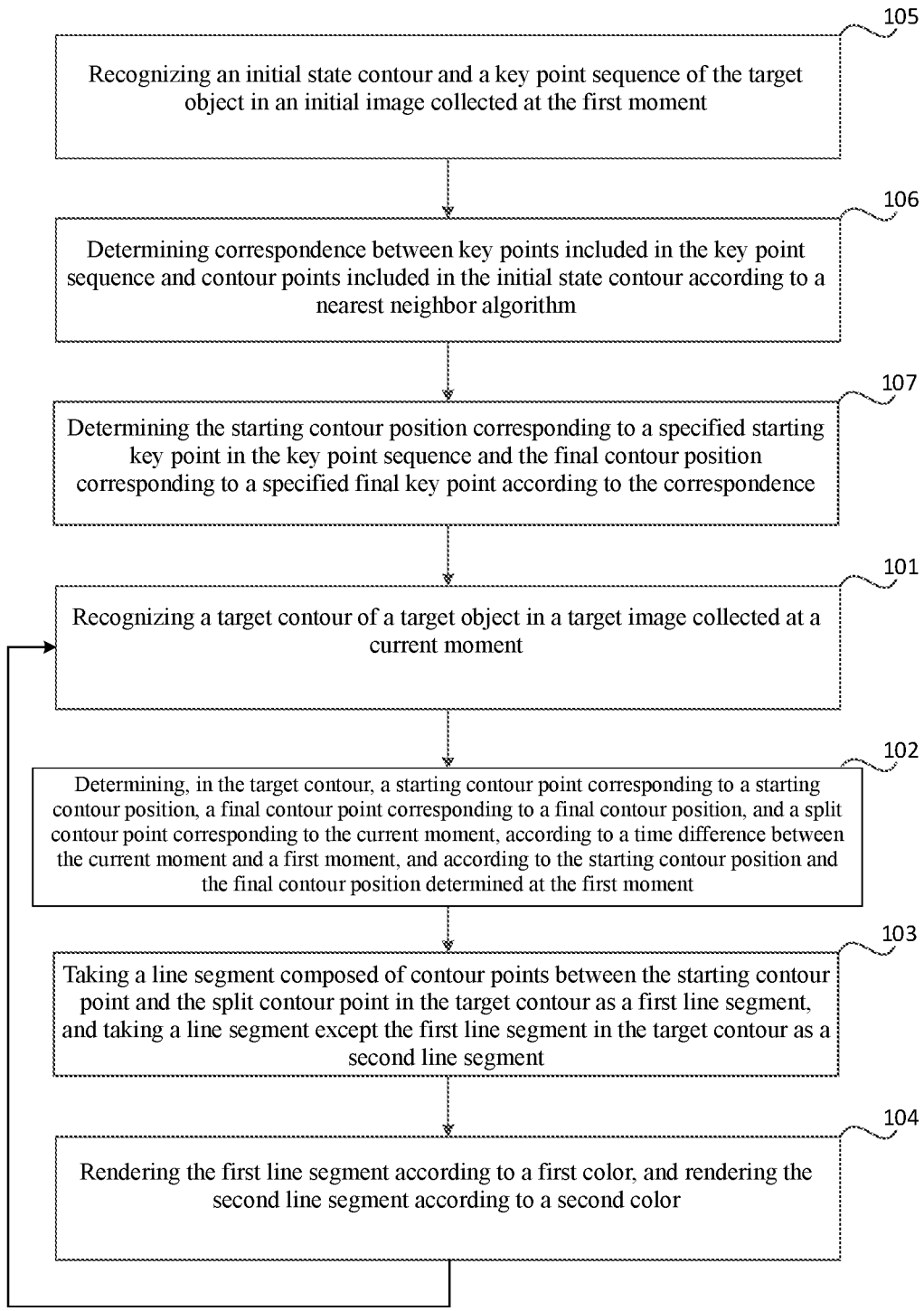
FIG. 4 is a flow chart of another image processing method shown according to an exemplary embodiment.

FIG. 4 is a flow chart of another image processing method shown according to an exemplary embodiment; as shown in FIG. 4, before step 101, the method further includes:

Step 105: recognizing an initial state contour and a key point sequence of the target object in an initial image collected at the first moment.

In a specific implementation scenario, the image collected by the terminal device at the first moment is the initial image, and then the initial state contour and the key point sequence of the target object in the initial image are recognized through the same recognition algorithm as in step 101. The key point sequence includes one or more key points; and with respect to different target objects, the key points included in the key point sequence may be different. For example, if the target object is a person, the key point sequence may include key points such as: head top, right shoulder, left shoulder, left elbow, right elbow, left shoulder-inner side, right shoulder-inner side, left elbow-inner side, right elbow-inner side, left hand, right hand, left hip, right hip, left knee, right knee, left foot, right foot, left knee-inner side, right knee-inner side, thigh-inner side, etc. If the target object is a car, the key point sequence may include key points such as: front, left front light, right front light, left rear light, right rear light, left front door, right front door, left rear door, right rear door, left front wheel, right front wheel, left rear wheel, right rear wheel, rear, roof, etc.

Step 106: determining correspondence between key points included in the key point sequence and contour points included in the initial state contour according to a nearest neighbor algorithm.

Step 107: determining the starting contour position corresponding to a specified starting key point in the key point sequence and the final contour position corresponding to a specified final key point according to the correspondence.

Exemplarily, the correspondence between the key points included in the key point sequence and the contour points included in the initial state contour may be obtained according to the nearest neighbor algorithm and a priori knowledge of the target object. The nearest neighbor algorithm may be a K Nearest Neighbor (kNN) algorithm. The correspondence may include a plurality of relationship records; and each relationship record includes a contour point corresponding to a key point in the initial state contour. Finally, according to the correspondence, the starting key point and the final key point set by the user through the terminal device at the first moment are determined, and the corresponding starting contour position and the corresponding final contour position are determined.

Figure 5:
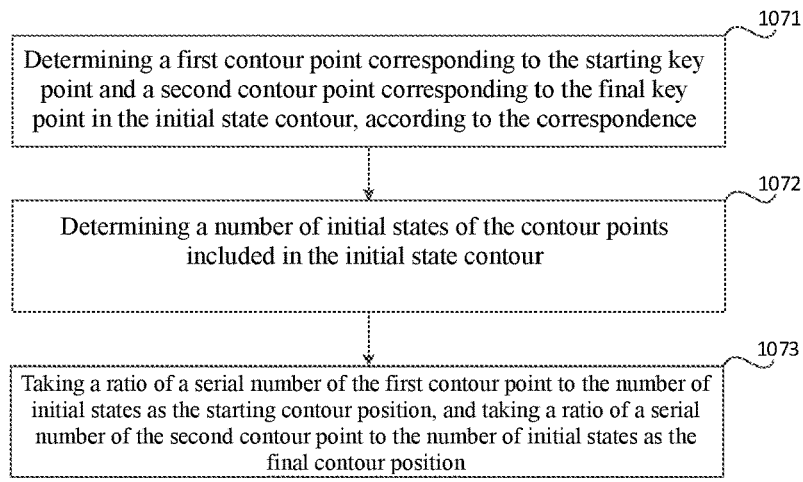
FIG. 5 is a flow chart of another image processing method shown according to an exemplary embodiment.

FIG. 5 is a flow chart of another image processing method shown according to an exemplary embodiment; as shown in FIG. 5, the implementation mode of step 107 may include:

Step 1071: determining a first contour point corresponding to the starting key point and a second contour point corresponding to the final key point in the initial state contour, according to the correspondence.

Step 1072: determining the number of initial states of the contour points included in the initial state contour.

Step 1073: taking a ratio of a serial number of the first contour point to the number of initial states as the starting contour position, and taking a ratio of a serial number of the second contour point to the number of initial states as the final contour position.

Specifically, when determining the starting contour position and the final contour position, the first contour point corresponding to the starting key point in the initial state contour and the second contour point corresponding to the final key point in the initial state contour may be determined firstly according to the correspondence. The first contour point is a contour point corresponding to the starting key point in the initial image, and corresponds to the starting contour point determined in step 102, that is, a portion of the target object that is identified by the first contour point in the initial image is the same as a portion of the target object that is identified by the starting contour point in the target image. Similarly, the second contour point is a contour point corresponding to the final key point in the initial image, and corresponds to the final contour point determined in step 102, that is, a portion of the target object that is identified by the second contour point in the initial image is the same as a portion of the target object that is identified by the final contour point in the target image.

Then, the number of initial states of the contour points included in the initial state contour is determined; finally a ratio of the serial number of the first contour point to the number of initial states is taken as the starting contour position; and a ratio of the serial number of the second contour point to the number of initial states is taken as the final contour position. For example, if the starting key point specified by the user is head top, the serial number of the corresponding first contour point is 0, the final key point is the left hand, the serial number of the corresponding second contour point is 130, and the number of initial states is 536, then the starting contour position is 0/536=0, and the final contour position is 130/536=0.243.

Figure 6:
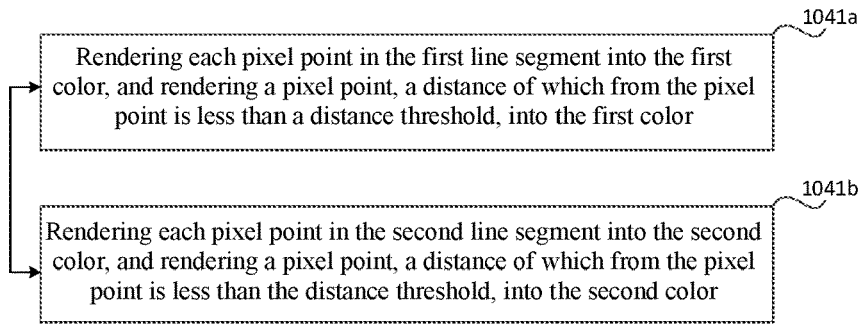
FIG. 6 is a flow chart of another image processing method shown according to an exemplary embodiment.

FIG. 6 is a flow chart of another image processing method shown according to an exemplary embodiment; as shown in FIG. 6, step 104 may be implemented by steps of:

Step 1041a: rendering each pixel point in the first line segment into the first color, and rendering a pixel point, a distance of which from the pixel point is less than a distance threshold, into the first color; and/or, Step 1041b: rendering each pixel point in the second line segment into the second color, and rendering a pixel point, a distance of which from the pixel point is less than the distance threshold, into the second color.

Figure 7:
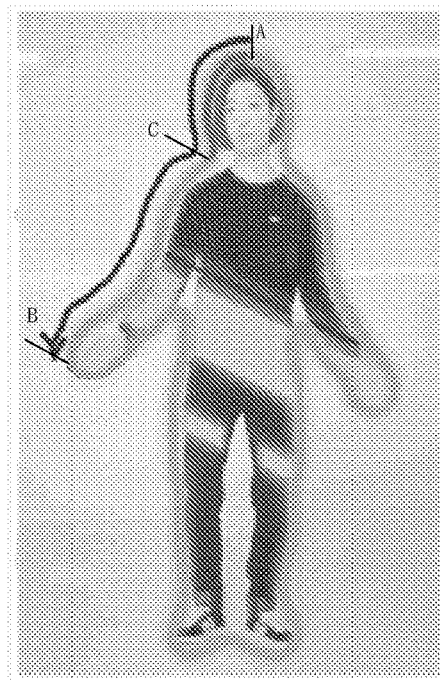
FIG. 7 is a rendered target image shown according to an exemplary embodiment.

For example, when rendering the first line segment and the second line segment, each pixel point in the first line segment and pixel points located in the vicinity of the pixel point (i.e., pixel points, distances of which from the pixel point are less than the distance threshold) may be all rendered into the first color; and each pixel point in the second line segment and pixel points located in the vicinity of the pixel point are all rendered into the second color. It may be understood that certain regions containing the target contour and located in the vicinity of the target contour are respectively rendered into the first color and the second color, which may make the rendered target contour more obvious and the effect of dynamic stroke more prominent. As shown in FIG. 7, point A is the starting contour point, point B is the final contour point, and point C is the split contour point; according to the counterclockwise direction, line segment AC is the first line segment, and line segment CB and line segment BA are combined to form the second line segment; the line segment AC and a region located in the vicinity of the line segment AC are rendered into the first color; and the line segment CB and the line segment BA, as well as a region located in the vicinity of the line segment CB and the line segment BA are rendered into the second color.

Figure 8:
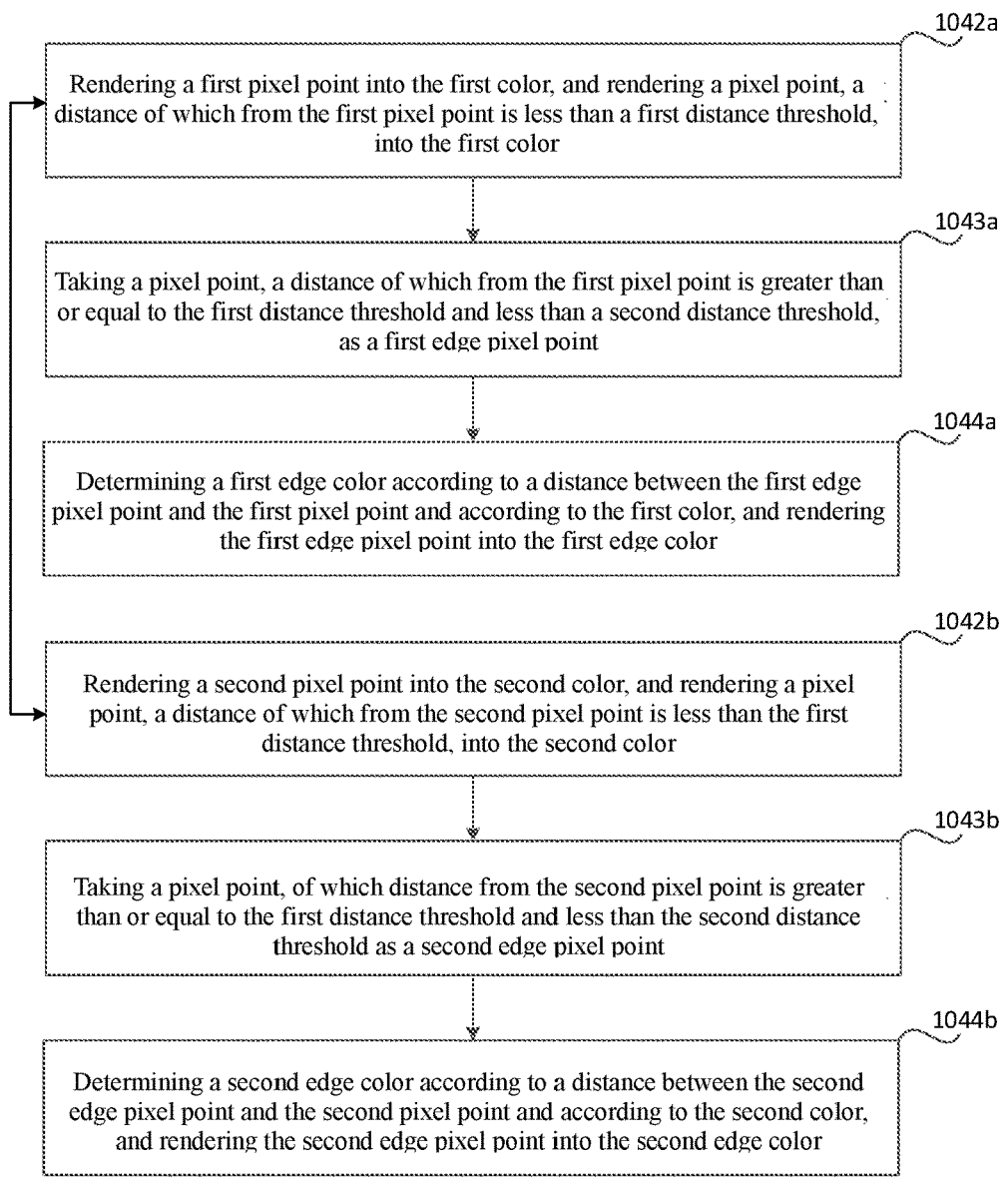
FIG. 8 is a flow chart of another image processing method shown according to an exemplary embodiment.

FIG. 8 is a flow chart of another image processing method shown according to an exemplary embodiment; as shown in FIG. 8, another implementation mode of step 104 may include:

Step 1042a: rendering a first pixel point into the first color, and rendering a pixel point, a distance of which from the first pixel point is less than a first distance threshold, into the first color, the first pixel point is any pixel point on the first line segment.

Step 1043a: taking a pixel point, a distance of which from the first pixel point is greater than or equal to the first distance threshold and less than a second distance threshold, as a first edge pixel point.

Step 1044a: determining a first edge color according to a distance between the first edge pixel point and the first pixel point, and according to the first color, and rendering the first edge pixel point into the first edge color. and/or, Step 1042b: rendering a second pixel point into the second color, and rendering a pixel point, a distance of which from the second pixel point is less than the first distance threshold, into the second color, the second pixel point is any pixel point on the second line segment.

Step 1043b: taking a pixel point, a distance of which from the second pixel point is greater than or equal to the first distance threshold and less than the second distance threshold, as a second edge pixel point.

Step 1044b: determining a second edge color according to a distance between the second edge pixel point and the second pixel point, and according to the second color, and rendering the second edge pixel point into the second edge color.

In another implementation mode, when rendering the first line segment, the first line segment may be rendered into the first color first. Then, according to the distance from the first line segment, different colors are selected to render the pixel points in the vicinity of the first line segment to achieve different effects of dynamic stroke. Taking the first pixel point as an example, a pixel point, a distance of which from the first pixel point is less than the first distance threshold, is rendered into the first color, that is, the pixel point is rendered into the same color as the first line segment. Then, a pixel point, a distance of which from the first pixel point is greater than or equal to the first distance threshold and less than the second distance threshold, is taken as the first edge pixel point. Finally, according to the distance between the first edge pixel point and the first pixel point, and the first color, the first edge color is determined; and the first edge pixel point is rendered into the first edge color. There may be a plurality of first edge pixel points; with respect to each edge pixel point, a first edge color is determined according to the distance of the edge pixel point from the first pixel point; and with respect to first edge pixel points, distances of which from the first pixel point are different, the corresponding first edge colors are also different. The execution steps of rendering the second line segment according to the second color are the same as the execution steps of rendering the first line segment according to the first color, and no details will be repeated here.

Specifically, the implementation mode of step 1044$a$ may be:

Firstly, determining transparency of the first edge color, according to the distance between the first edge pixel point and the first pixel point, the transparency of the first edge color is positively correlated with the distance between the first edge pixel point and the first pixel point. The distance between the first edge pixel point and the first pixel point is zero, then transparency of the first color is 0% (i.e., the first pixel point and the pixel point, a distance of which from the first pixel point is less than the first distance threshold, are rendered into the first color). Transparency of the first edge color may be 1.5th power of the distance between the first edge pixel point and the first pixel point, and then multiplied by a preset scale factor k. Taking the scale factor of 1% as an example, if the distance between the first edge pixel point and the first pixel point is 10 pixels, then transparency of the first edge color=k*(10)^1.5=31.6%; if the distance between the first edge pixel points and the first pixel point is 20 pixels, then transparency of the first edge color=k*(20)^1.5=89.5%. An upper limit of transparency is 100%; and when transparency of the first edge color is 100%, the first edge pixel point is not rendered.

Figure 9:
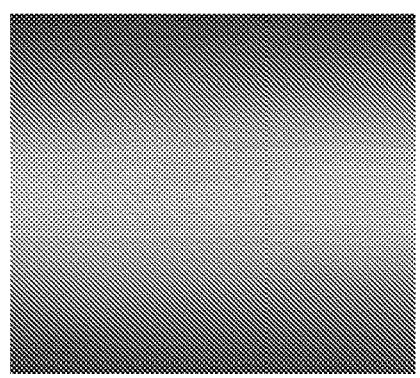
FIG. 9 is a rendered target image shown according to an exemplary embodiment.

Thereafter, taking chromaticity of the first color as chromaticity of the first edge color. Finally, rendering the first edge pixel point into the first edge color. It may be understood that chromaticity of the first edge color is the same as chromaticity of the first color, and transparency of the first edge color is higher than transparency of the first color; in this way, as the distance from the first pixel point increases, transparency of the first edge pixel point is getting higher and higher, thereby creating a gradient and neon effect, which is shown in FIG. 9.

Similarly, an implementation mode of step 1044$b$ may be: firstly, determining transparency of the second edge color according to the distance between the second edge pixel point and the second pixel point, the transparency of the second edge color is positively correlated with the distance between the second edge pixel point and the second pixel point; thereafter, taking chromaticity of the second color as chromaticity of the second edge color; and finally, rendering the second edge pixel point into the second edge color.

In this way, the first line segment may be rendered into the first color; as the distance from the first line segment increases, the transparency of the region in the vicinity of the first line segment is becoming higher and higher, and the second line segment may also be rendered into the second color; as the distance from the second line segment increases, the transparency the region in the vicinity of the second line segment is becoming higher and higher, thereby creating a gradient and neon effect.

To sum up, the present disclosure firstly recognizes a target contour of a target object from a target image collected at a current moment; then according to a time difference between the current moment and a first moment, determines a starting contour point corresponding to a starting contour position, a final contour point corresponding to a final contour position, and a split contour point corresponding to the current moment in the target contour; then takes a line segment composed of contour points between the starting contour point and the split contour point as a first line segment, and takes a line segment except the first line segment in the target contour as a second line segment; finally renders the first line segment according to a first color, and renders the second line segment according to a second color. The above-described steps are repeatedly executed until the line segment composed of the contour points between the starting contour point and the final contour point is rendered into the first color. The present disclosure can implement an effect of dynamic stroke on the contour of the target object, within a certain range indicated by the starting contour position and the final contour position.

Figure 10:
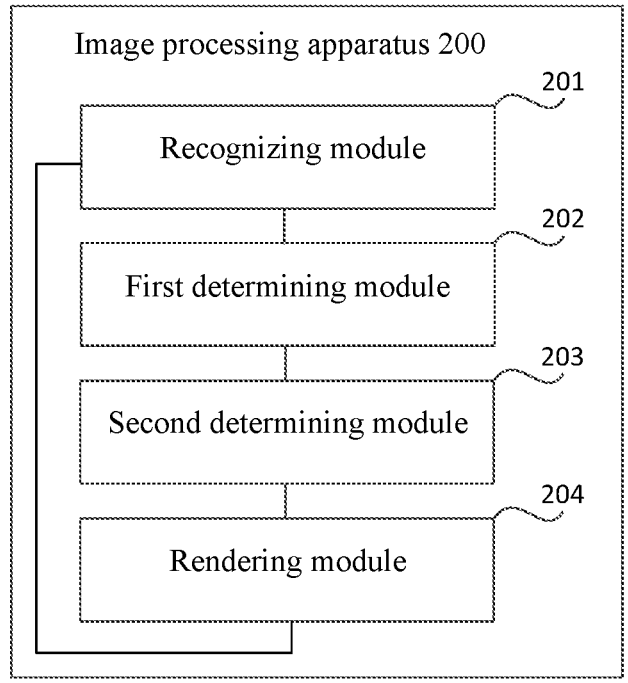
FIG. 10 is a block diagram of an image processing apparatus shown according to an exemplary embodiment.

FIG. 10 is a block diagram of an image processing apparatus shown according to an exemplary embodiment; as shown in FIG. 10, the apparatus 200 includes:

A recognizing module 201, configured to recognize a target contour of a target object in a target image collected at a current moment, the target contour includes a plurality of contour points.

A first determining module 202, configured to determine, in the target contour, a starting contour point corresponding to a starting contour position, a final contour point corresponding to a final contour position, and a split contour point corresponding to the current moment, according to a time difference between the current moment and a first moment, and according to the starting contour position and the final contour position determined at the first moment, the first moment is a moment before the current moment.

A second determining module 203, configured to take a line segment composed of the contour points between the starting contour point and the split contour point in the target contour as a first line segment, and take a line segment except the first line segment in the target contour as a second line segment.

A rendering module 204, configured to render the first line segment according to a first color, and render the second line segment according to a second color, the first color is different from the second color.

Repeatedly execute a step of recognizing a target contour of a target object in a target image collected at a current moment, to a step of rendering a first line segment according to the first color, and rendering a second line segment according to the second color, until the line segment composed of the contour points between the starting contour point and the final contour point in the target contour is rendered into the first color.

Figure 11:
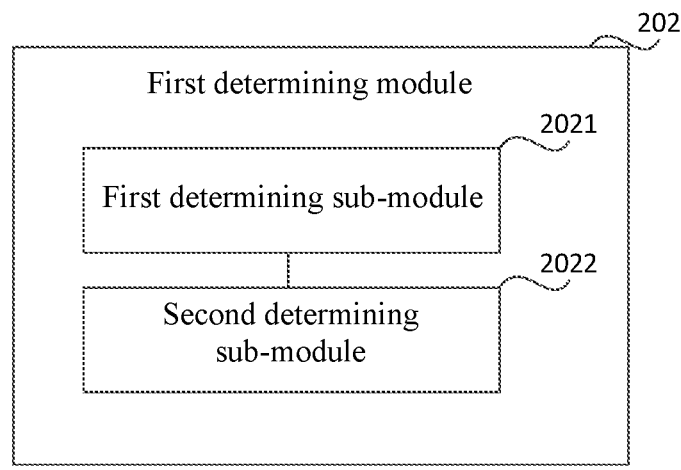
FIG. 11 is a block diagram of another image processing apparatus shown according to an exemplary embodiment.

FIG. 11 is a block diagram of another image processing apparatus shown according to an exemplary embodiment; as shown in FIG. 11, the first determining module 202 includes:

A first determining sub-module 2021, configured to determine the split contour position corresponding to the current moment according to the time difference between the current moment and the first moment and according to the starting contour position and the final contour position.

A second determining sub-module 2022, configured to determine the starting contour point, the final contour point, and the split contour point corresponding to the split contour position in the target contour, according to a target number of contour points included in the target contour.

Figure 12:
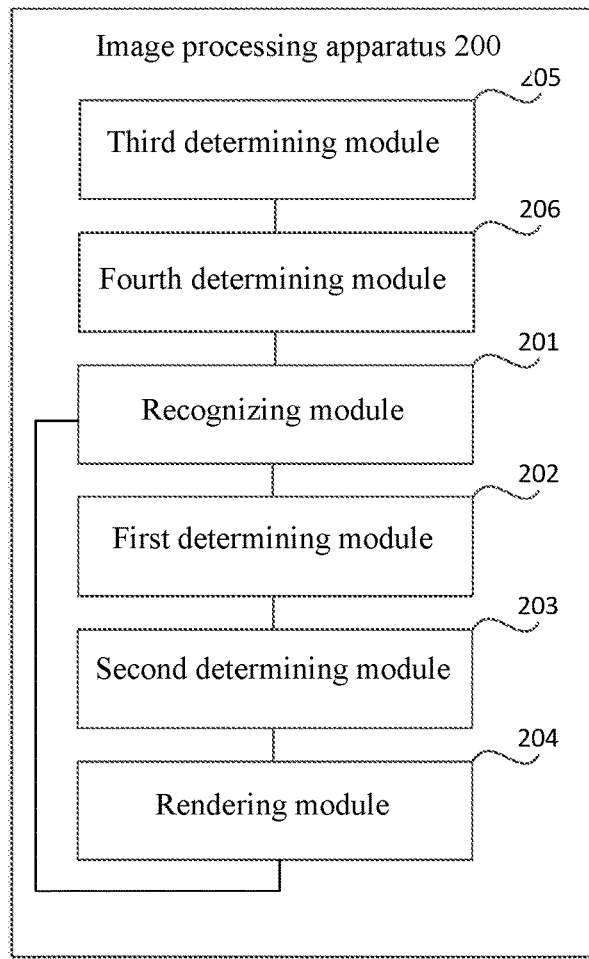
FIG. 12 is a block diagram of another image processing apparatus shown according to an exemplary embodiment.

FIG. 12 is a block diagram of another image processing apparatus shown according to an exemplary embodiment; as shown in FIG. 12, the apparatus 200 further includes:

A recognizing module 201, further configured to recognize an initial state contour and a key point sequence of the target object in an initial image collected at the first moment, before recognizing the target contour of the target object in the target image collected at the current moment.

A third determining module 205, configured to determine correspondence between key points included in the key point sequence and contour points included in the initial state contour according to a nearest neighbor algorithm.

A fourth determining module 206, configured to determine the starting contour position corresponding to a specified starting key point in the key point sequence and the final contour position corresponding to a specified final key point according to the correspondence.

Figure 13:
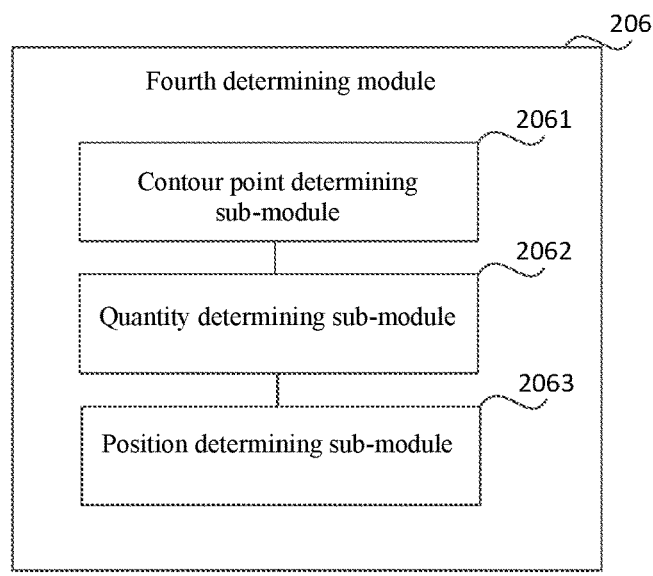
FIG. 13 is a block diagram of another image processing apparatus shown according to an exemplary embodiment.

FIG. 13 is a block diagram of another image processing apparatus shown according to an exemplary embodiment; as shown in FIG. 13, the fourth determining module 206 includes:

A contour point determining sub-module 2061, configured to determine a first contour point corresponding to the starting key point and a second contour point corresponding to the final key point in the initial state contour, according to the correspondence.

A quantity determining sub-module 2062, configured to determine a number of initial states of the contour points included in the initial state contour.

A position determining sub-module 2063, configured to take a ratio of a serial number of the first contour point to a number of initial states as the starting contour position, and take a ratio of a serial number of the second contour point to the number of initial states as the final contour position.

Figure 14:
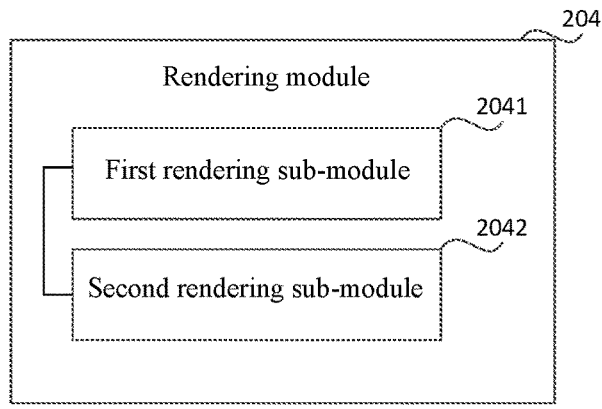
FIG. 14 is a block diagram of another image processing apparatus shown according to an exemplary embodiment.

FIG. 14 is a block diagram of another image processing apparatus shown according to an exemplary embodiment; as shown in FIG. 14, the rendering module 204 includes:

A first rendering sub-module 2041, configured to render each pixel point in the first line segment into the first color, and render a pixel point, a distance of which from the pixel point is less than a distance threshold, into the first color; and/or, A second rendering sub-module 2042, configured to render each pixel point in the second line segment into the second color, and render a pixel point, a distance of which from the pixel point is less than the distance threshold, into the second color.

Figure 15:
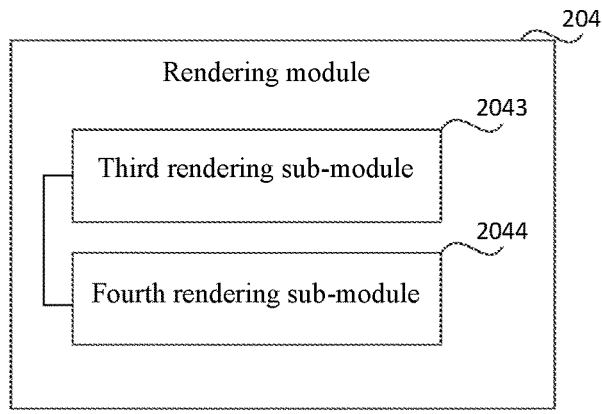
FIG. 15 is a block diagram of another image processing apparatus shown according to an exemplary embodiment.

FIG. 15 is a block diagram of another image processing apparatus shown according to an exemplary embodiment; as shown in FIG. 15, the rendering module 204 includes:

A third rendering sub-module 2043, configured to render a first pixel point into the first color, and render a pixel point, a distance of which from the first pixel point is less than a first distance threshold, into the first color, the first pixel point is any pixel point on the first line segment.

A third rendering sub-module 2043, further configured to take a pixel point, a distance of which from the first pixel point is greater than or equal to the first distance threshold and less than a second distance threshold, as a first edge pixel point.

A third rendering sub-module 2043, further configured to determine a first edge color according to a distance between the first edge pixel point and the first pixel point and according to the first color, and render the first edge pixel point into the first edge color.

and/or,

A fourth rendering sub-module 2044, configured to render a second pixel point into the second color, and render a pixel point, a distance of which from the second pixel point is less than the first distance threshold, into the second color, the second pixel point is any pixel point on the second line segment.

A fourth rendering sub-module 2044, further configured to take a pixel point, a distance of which from the second pixel point is greater than or equal to the first distance threshold and less than the second distance threshold, as a second edge pixel point.

A fourth rendering sub-module 2044, further configured to determine a second edge color according to a distance between the second edge pixel point and the second pixel point and according to the second color, and render the second edge pixel point into the second edge color.

Specifically, the third rendering sub-module 2043 is configured to execute steps of:

Step 1): determining transparency of the first edge color according to the distance between the first edge pixel point and the first pixel point, the transparency of the first edge color is positively correlated with the distance between the first edge pixel point and the first pixel point.

Step 2): taking chromaticity of the first color as chromaticity of the first edge color.

Step 3): rendering the first edge pixel point into the first edge color.

The fourth rendering sub-module 2044 is configured to execute steps of:

Step 4): determining transparency of the second edge color according to the distance between the second edge pixel point and the second pixel point, the transparency of the second edge color is positively correlated with the distance between the second edge pixel point and the second pixel point.

Step 5): taking chromaticity of the second color as chromaticity of the second edge color.

Step 6): rendering the second edge pixel point into the second edge color.

With respect to the apparatus according to the above-described embodiment, the specific modes in which the respective modules execute operations have been described in detail in the embodiment of the method, and no details will be repeated here.

To sum up, the present disclosure firstly recognizes a target contour of a target object from a target image collected at a current moment; then according to a time difference between the current moment and a first moment, determines a starting contour point corresponding to a starting contour position, a final contour point corresponding to a final contour position, and a split contour point corresponding to the current moment in the target contour; then takes a line segment composed of contour points between the starting contour point and the split contour point as a first line segment, and takes a line segment except the first line segment in the target contour as a second line segment; finally renders the first line segment according to a first color, and renders the second line segment according to a second color. The above-described steps are repeatedly executed until the line segment composed of the contour points between the starting contour point and the final contour point is rendered into the first color. The present disclosure can implement an effect of dynamic stroke on the contour of the target object, within a certain range indicated by the starting contour position and the final contour position.

Figure 16:
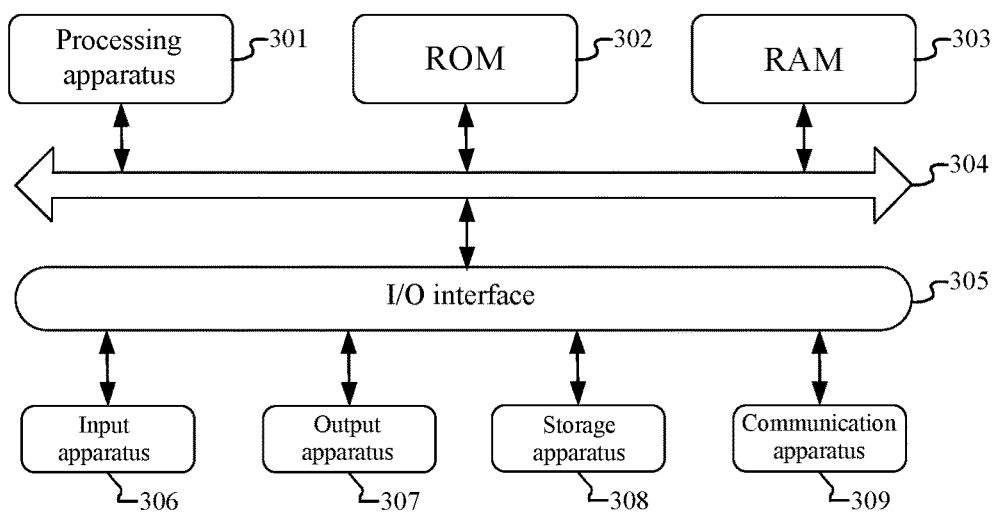
FIG. 16 is a block diagram of a device shown according to an exemplary embodiment.

Referring next to FIG. 16, it shows a schematic structural diagram of an electronic device (e.g., a terminal device or a server in FIG. 1) 300 suitable for implementing an embodiment of the present disclosure. The electronic device (i.e., the executing body of the above-described image processing method) according to the embodiment of the present disclosure may be a server; for example, the server may be a local server or a cloud server, or may also be a terminal device; the terminal device may include, but not limited to, a mobile terminal such as a mobile phone, a laptop, a digital broadcast receiver, a Personal Digital Assistant (PDA), a Portable Android Device (PAD), a Portable Multimedia Player (PMP), a vehicle-mounted terminal (e.g., a vehicle-mounted navigation terminal), etc., and a stationary terminal such as a digital TV, a desktop computer, etc. The user may upload the target image or the initial image by logging in to the server, or may also directly upload the target image or the initial image through the terminal device, or collect the target image or the initial image through the terminal device. The terminal device shown in FIG. 6 is only an example, and should not impose any limitation on the function and use scope of the embodiments of the present disclosure.

As shown in FIG. 16, the electronic device 300 may include a processing apparatus (e.g., a central processing unit, a graphics processor, etc.) 301, which may execute various appropriate actions and processing according to a program stored in a Read-Only Memory (ROM) 302 or a program loaded from a storage apparatus 308 into a Random Access Memory (RAM) 303. The RAM 303 further stores various programs and data required for operation of the electronic device 300. The processing apparatus 301, the ROM 302, and the RAM 303 are connected with each other through a bus 304. An input/output (I/O) interface 305 is also coupled to the bus 304.

Usually, apparatuses below may be coupled to the I/O interface 305: an input apparatuses 306 including, for example, a touch screen, a touch pad, a keyboard, a mouse, a camera, a microphone, an accelerometer, a gyroscope, etc.; an output apparatuses 307 including, for example, a Liquid Crystal Display (LCD), a speaker, a vibrator, etc.; a storage apparatus 308 including, for example, a magnetic tape, a hard disk, etc.; and a communication apparatus 309. The communication apparatus 309 may allow the electronic device 300 to perform wireless or wired communication with other device so as to exchange data. Although FIG. 16 shows the electronic device 300 having various apparatuses, it should be understood that it is not required to implement or have all the apparatuses shown, and the electronic device 300 may alternatively implement or have more or fewer apparatuses.

Particularly, according to some embodiments of the present disclosure, the flows as described above with reference to the flow charts may be implemented as computer software programs. For example, some embodiments of the present disclosure include a computer program product, which includes a computer program carried on a computer-readable medium, and the computer program contains program codes for executing the method illustrated in the flow chart. In some such embodiments, the computer program may be downloaded and installed from the network via the communication apparatus 309, or installed from the storage apparatus 308, or installed from the ROM 302. When executed by the processing apparatus 301, the computer program executes the above-described functions defined in the methods according to some embodiments of the present disclosure.

It should be noted that, in some embodiments of the present disclosure, the above-described computer-readable medium may be a computer-readable signal medium or a computer-readable storage medium, or any combination of the above two. The computer-readable storage medium may be, for example, but not limited to, an electronic, magnetic, optical, electromagnetic, infrared, or semiconductor system, apparatus, or device, or any suitable combination of the above. More specific examples of the computer-readable storage medium may include, but not limited to: an electrical connection having one or more conductors, a portable computer diskette, a hard disk, a random access memory (RAM), a read-only memory (ROM); an erasable programmable read-only memory (EPROM or flash memory); an optical fiber, a portable compact disc read-only memory (CD-ROM); an optical storage apparatus; a magnetic storage apparatus; or any suitable combination of the above. In the present disclosure, the computer-readable storage medium may be any tangible medium that contains or stores a program that may be used by or in conjunction with an instruction executing system, an apparatus, or a device. In the present disclosure, the computer-readable signal medium may include a data signal propagated in baseband or as a portion of a carrier wave, which carries a computer-readable program code therein. Such propagated data signals may take a variety of forms, including but not limited to, electromagnetic signals, optical signals, or any suitable combination of the above. The computer-readable signal medium may also be any computer-readable medium other than a computer-readable storage medium; and the computer-readable signal medium may transmit, propagate, or transport programs for use by or in combination with the instruction executing system, the apparatus, or the device. The program code embodied on the computer-readable medium may be transmitted by using any suitable medium, including, but not limited to, an electrical wire, an optical cable, a radio frequency (RF), etc., or any suitable combination of the above.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-described computer-readable medium may be included in the above-described electronic device, or may also exist alone without being assembled into the electronic device.

The above-described computer-readable medium carries one or more programs, and when the one or more programs are executed by the electronic device, the electronic device is cause to: recognizing a target contour of a target object in a target image collected at a current moment, the target contour comprises a plurality of contour points; determining, in the target contour, a starting contour point corresponding to a starting contour position, a final contour point corresponding to a final contour position, and a split contour point corresponding to the current moment, according to a time difference between the current moment and a first moment, and according to the starting contour position and the final contour position determined at the first moment, the first moment is a moment before the current moment; taking a line segment composed of contour points between the starting contour point and the split contour point in the target contour as a first line segment, and taking a line segment except the first line segment in the target contour as a second line segment; rendering the first line segment according to a first color, and rendering the second line segment according to a second color, the first color is different from the second color; and repeatedly executing a step of recognizing a target contour of a target object in the target image collected at a current moment, to a step of rendering a first line segment according to the first color, and rendering a second line segment according to the second color, until a line segment composed of contour points between the starting contour point and the final contour point in the target contour is rendered into the first color.

The computer program codes for executing the operations according to some embodiments of the present disclosure may be written in one or more programming languages or a combination thereof; the above-described programming languages include object-oriented programming languages such as Java, Smalltalk, C++, and also include conventional procedural programming languages such as "C" language or similar programming languages. The program code may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flow chart or block diagrams may represent a module, a program segment, or a portion of codes, which comprises one or more executable instructions for implementing specified logical function. It should also be noted that, in some alternative implementations, the functions noted in the block may occur out of the order noted in the accompanying drawings. For example, two blocks shown in succession may, in fact, can be executed substantially concurrently, or the blocks may sometimes be executed in a reverse order, depending upon the functionality involved. It should also be noted that, each block of the block diagrams and/or flow charts, and combinations of blocks in the block diagrams and/or flow charts, may be implemented by special purpose hardware-based systems that execute the specified functions or operations, or may also be implemented by a combination of special purpose hardware and computer instructions.

The units as described in some embodiments of the present disclosure may be implemented by means of software, or may also be implemented by means of hardware. The name of the module does not constitute a limitation on the module per se under certain circumstances, for example, the first determining module may also be described as a "module for acquiring contour points".

The functions described herein above may be executed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, a machine-readable medium may be a tangible medium that may contain or store a program for use by an instruction execution system, apparatus or device, or may contain or store a program for use in conjunction with an instruction execution system, apparatus or device. The machine-readable medium may be a machine-readable signal medium or a machine-readable storage medium. Machine-readable media may include, but are not limited to, an electronic, magnetic, optical, electromagnetic, infrared, or semiconductor system, apparatus, or device, or any suitable combination of the above. More specific examples of the machine-readable storage medium may include: an electrical connection having one or more conductors, a portable computer diskette, a hard disk, a random access memory (RAM), a read-only memory (ROM); an erasable programmable read-only memory (EPROM or flash memory); an optical fiber, a portable compact disc read-only memory (CD-ROM); an optical storage apparatus; a magnetic storage apparatus; or any suitable combination of the above.

According to one or more embodiments of the present disclosure, example 1 provides an image processing method, which comprises: recognizing a target contour of a target object in a target image collected at a current moment, the target contour comprises a plurality of contour points; determining, in the target contour, a starting contour point corresponding to a starting contour position, a final contour point corresponding to a final contour position, and a split contour point corresponding to the current moment, according to a time difference between the current moment and a first moment, and according to the starting contour position and the final contour position determined at the first moment, the first moment is a moment before the current moment; taking a line segment composed of contour points between the starting contour point and the split contour point in the target contour as a first line segment, and taking a line segment except the first line segment in the target contour as a second line segment; rendering the first line segment according to a first color, and rendering the second line segment according to a second color, the first color is different from the second color; and repeatedly executing a step of recognizing a target contour of a target object in the target image collected at a current moment, to a step of rendering a first line segment according to the first color, and rendering a second line segment according to the second color, until a line segment composed of contour points between the starting contour point and the final contour point in the target contour is rendered into the first color.

According to one or more embodiments of the present disclosure, example 2 provides the method of example 1, the determining, in the target contour, the starting contour point corresponding to the starting contour position, the final contour point corresponding to the final contour position, and the split contour point corresponding to the current moment, according to the time difference between the current moment and a first moment, and according to the starting contour position and the final contour position determined at the first moment, comprises: determining the split contour position corresponding to the current moment according to the time difference between the current moment and the first moment and according to the starting contour position and the final contour position; and determining the starting contour point, the final contour point, and the split contour point corresponding to the split contour position in the target contour, according to a target number of contour points included in the target contour.

According to one or more embodiments of the present disclosure, example 3 provides the method of example 1, before the recognizing a target contour of a target object in a target image collected at a current moment, the method further comprises: recognizing an initial state contour and a key point sequence of the target object in an initial image collected at the first moment; determining correspondence between key points included in the key point sequence and contour points included in the initial state contour according to a nearest neighbor algorithm; and determining the starting contour position corresponding to a specified starting key point in the key point sequence and the final contour position corresponding to a specified final key point according to the correspondence.

According to one or more embodiments of the present disclosure, example 4 provides the method of example 3, the determining the starting contour position corresponding to the specified starting key point in the key point sequence and the final contour position corresponding to the specified final key point according to the correspondence, comprises: determining a first contour point corresponding to the starting key point and a second contour point corresponding to the final key point in the initial state contour, according to the correspondence; determining a number of initial states of the contour points included in the initial state contour; and taking a ratio of a serial number of the first contour point to the number of initial states as the starting contour position, and taking a ratio of a serial number of the second contour point to the number of initial states as the final contour position.

According to one or more embodiments of the present disclosure, example 5 provides the method of any one of example 1 to example 4, the rendering the first line segment according to the first color, and rendering the second line segment according to the second color, comprises: rendering each pixel point in the first line segment into the first color, and rendering a pixel point, a distance of which from the pixel point is less than a distance threshold, into the first color; and/or, rendering each pixel point in the second line segment into the second color, and rendering a pixel point, a distance of which from the pixel point is less than the distance threshold, into the second color.

According to one or more embodiments of the present disclosure, example 6 provides the method of any one of example 1 to example 4, the rendering the first line segment according to a first color, and rendering the second line segment according to a second color, comprises: rendering a first pixel point into the first color, and rendering a pixel point, a distance of which from the first pixel point is less than a first distance threshold, into the first color, the first pixel point is any pixel point on the first line segment; taking a pixel point, a distance of which from the first pixel point is greater than or equal to the first distance threshold and less than a second distance threshold, as a first edge pixel point; and determining a first edge color according to a distance between the first edge pixel point and the first pixel point and according to the first color, and rendering the first edge pixel point into the first edge color; and/or, rendering a second pixel point into the second color, and rendering a pixel point, a distance of which from the second pixel point is less than the first distance threshold, into the second color, the second pixel point is any pixel point on the second line segment; taking a pixel point, a distance of which from the second pixel point is greater than or equal to the first distance threshold and less than the second distance threshold, as a second edge pixel point; and determining a second edge color according to a distance between the second edge pixel point and the second pixel point, and according to the second color, and rendering the second edge pixel point into the second edge color.

According to one or more embodiments of the present disclosure, example 7 provides the method of example 6, the determining the first edge color according to the distance between the first edge pixel point and the first pixel point, and the first color, and the rendering the first edge pixel point into the first edge color, comprises: determining transparency of the first edge color according to the distance between the first edge pixel point and the first pixel point, the transparency of the first edge color is positively correlated with the distance between the first edge pixel point and the first pixel point; taking chromaticity of the first color as chromaticity of the first edge color; and rendering the first edge pixel point into the first edge color; and the determining a second edge color according to the distance between the second edge pixel point and the second pixel point, and the second color, and the rendering the second edge pixel point into the second edge color, comprises: determining transparency of the second edge color according to the distance between the second edge pixel point and the second pixel point, the transparency of the second edge color is positively correlated with the distance between the second edge pixel point and the second pixel point; taking chromaticity of the second color as chromaticity of the second edge color; and rendering the second edge pixel point into the second edge color.

According to one or more embodiments of the present disclosure, example 8 provides an image processing apparatus, which comprises: a recognizing module, configured to recognize a target contour of a target object in a target image collected at a current moment, the target contour comprises a plurality of contour points; a first determining module, configured to determine, in the target contour, a starting contour point corresponding to a starting contour position, a final contour point corresponding to a final contour position, and a split contour point corresponding to the current moment, according to a time difference between the current moment and a first moment, and according to the starting contour position and the final contour position determined at the first moment, the first moment is a moment before the current moment; a second determining module, configured to take a line segment composed of contour points between the starting contour point and the split contour point in the target contour as a first line segment, and take a line segment except the first line segment in the target contour as a second line segment; and a rendering module, configured to render the first line segment according to a first color, and render the second line segment according to a second color, the first color is different from the second color; repeatedly executing a step of recognizing a target contour of a target object in a target image collected at a current moment, to a step of rendering a first line segment according to the first color, and rendering a second line segment according to the second color, until a line segment composed of the contour points between the starting contour point and the final contour point in the target contour is rendered into the first color.

According to one or more embodiments of the present disclosure, example 9 provides a computer-readable medium, on which a computer program is stored, when executed by a processing apparatus, the program implements steps of the method according to any one of example 1 to example 7.

According to one or more embodiments of the present disclosure, example 10 provides an electronic device, which comprises: a storage apparatus, on which a computer program is stored; a processing apparatus, configured to execute the computer program in the storage apparatus, to implement steps of the method according to any one of example 1 to example 7.

According to one or more embodiments of the present disclosure, example 11 provides a computer program, comprising program codes, when a computer runs the computer program, the program codes execute steps of the method according to any one of example 1 to example 7.

The above descriptions are merely some preferred embodiments of the present disclosure and illustrations of the applied technical principles. Those skilled in the art should understand that the scope of the invention involved in the embodiments of the present disclosure is not limited to the technical solution formed by the specific combination of the above-mentioned technical features, and should also cover, without departing from the above-mentioned inventive concept, other technical solutions formed by any combination of the above-mentioned technical features or their equivalent features, for example, the technical solution formed by replacing the above features with the technical features with similar functions disclosed in the embodiments of the present disclosure (but not limited to).

Additionally, although operations are depicted in a specific order, it should not be construed as requiring that the operations be executed in the specific order as shown or in a sequential order. Under certain circumstances, multitasking and parallel processing may be advantageous. Likewise, although the above discussion contains several implementation-specific details, these should not be construed as limitations on the scope of the present disclosure. Certain features that are described in the context of separate embodiments may also be implemented in combination in a single embodiment. Conversely, various features that are described in the context of a single embodiment may also be implemented in various embodiments separately or in any suitable subcombination.

Although the subject matter has been described in language specific to structural features and/or logical actions of methods, it should be understood that the subject matters defined in the appended claims are not necessarily limited to the specific features or actions described above. Conversely, the specific features and actions described above are merely example forms for implementing the claims. With respect to the apparatus in the above embodiments, the specific mode in which each module executes the operation has been described in detail in the embodiments of the method, and no details will be repeated here.

What is claimed is:

1. An image processing method, comprising:
    recognizing a target contour of a target object in a target image collected at a current moment, wherein the target contour comprises a plurality of contour points;
    determining, in the target contour, a starting contour point corresponding to a starting contour position, a final contour point corresponding to a final contour position, and a split contour point corresponding to the current moment, according to a time difference between the current moment and a first moment, and according to the starting contour position and the final contour position determined at the first moment, wherein the first moment is a moment before the current moment;
    taking a line segment composed of contour points between the starting contour point and the split contour point in the target contour as a first line segment, and taking a line segment except the first line segment in the target contour as a second line segment; and
    rendering the first line segment according to a first color, and rendering the second line segment according to a second color, wherein the first color is different from the second color.

2. The method according to claim 1, wherein, the determining, in the target contour, the starting contour point corresponding to the starting contour position, the final contour point corresponding to the final contour position, and the split contour point corresponding to the current moment, according to the time difference between the current moment and a first moment, and according to the starting contour position and the final contour position determined at the first moment, comprises:
    determining the split contour position corresponding to the current moment according to the time difference between the current moment and the first moment and according to the starting contour position and the final contour position; and
    determining the starting contour point, the final contour point, and the split contour point corresponding to the split contour position in the target contour, according to a target number of contour points included in the target contour.

3. The method according to claim 1, wherein, before the recognizing a target contour of a target object in a target image collected at a current moment, the method further comprises:
    recognizing an initial state contour and a key point sequence of the target object in an initial image collected at the first moment;
    determining correspondence between key points included in the key point sequence and contour points included in the initial state contour according to a nearest neighbor algorithm; and
    determining the starting contour position corresponding to a specified starting key point in the key point sequence and the final contour position corresponding to a specified final key point according to the correspondence.

4. The method according to claim 3, wherein, the determining the starting contour position corresponding to the specified starting key point in the key point sequence and the final contour position corresponding to the specified final key point according to the correspondence, comprises:
    determining a first contour point corresponding to the starting key point and a second contour point corresponding to the final key point in the initial state contour, according to the correspondence;
    determining a number of initial states of the contour points included in the initial state contour; and
    taking a ratio of a serial number of the first contour point to the number of initial states as the starting contour position, and taking a ratio of a serial number of the second contour point to the number of initial states as the final contour position.

5. The method according to claim 1, wherein, the rendering the first line segment according to the first color, and rendering the second line segment according to the second color, comprises:
    rendering each pixel point in the first line segment into the first color, and rendering a pixel point, a distance of which from the pixel point is less than a distance threshold, into the first color; and/or,
    rendering each pixel point in the second line segment into the second color, and rendering a pixel point, a distance of which from the pixel point is less than the distance threshold, into the second color.

6. The method according to claim 1, wherein, the rendering the first line segment according to a first color, and rendering the second line segment according to a second color, comprises:
rendering a first pixel point into the first color, and rendering a pixel point, a distance of which from the first pixel point is less than a first distance threshold, into the first color, wherein the first pixel point is any pixel point on the first line segment;
taking a pixel point, a distance of which from the first pixel point is greater than or equal to the first distance threshold and less than a second distance threshold, as a first edge pixel point; and
determining a first edge color according to a distance between the first edge pixel point and the first pixel point and according to the first color, and rendering the first edge pixel point into the first edge color;
and/or,
rendering a second pixel point into the second color, and rendering a pixel point, a distance of which from the second pixel point is less than the first distance threshold, into the second color, wherein the second pixel point is any pixel point on the second line segment;
taking a pixel point, a distance of which from the second pixel point is greater than or equal to the first distance threshold and less than the second distance threshold, as a second edge pixel point; and
determining a second edge color according to a distance between the second edge pixel point and the second pixel point, and according to the second color, and rendering the second edge pixel point into the second edge color.

7. The method according to claim 6, wherein, the determining the first edge color according to the distance between the first edge pixel point and the first pixel point, and the first color, and the rendering the first edge pixel point into the first edge color, comprises:
determining transparency of the first edge color according to the distance between the first edge pixel point and the first pixel point, wherein the transparency of the first edge color is positively correlated with the distance between the first edge pixel point and the first pixel point;
taking chromaticity of the first color as chromaticity of the first edge color; and
rendering the first edge pixel point into the first edge color; and
the determining a second edge color according to the distance between the second edge pixel point and the second pixel point, and the second color, and the rendering the second edge pixel point into the second edge color, comprises:
determining transparency of the second edge color according to the distance between the second edge pixel point and the second pixel point, wherein the transparency of the second edge color is positively correlated with the distance between the second edge pixel point and the second pixel point;
taking chromaticity of the second color as chromaticity of the second edge color; and
rendering the second edge pixel point into the second edge color.

8. The method according to claim 2, wherein, before the recognizing a target contour of a target object in a target image collected at a current moment, the method further comprises:

recognizing an initial state contour and a key point sequence of the target object in an initial image collected at the first moment;
determining correspondence between key points included in the key point sequence and contour points included in the initial state contour according to a nearest neighbor algorithm; and
determining the starting contour position corresponding to a specified starting key point in the key point sequence and the final contour position corresponding to a specified final key point according to the correspondence.

9. The method according to claim 8, wherein, the determining the starting contour position corresponding to the specified starting key point in the key point sequence and the final contour position corresponding to the specified final key point according to the correspondence, comprises:
determining a first contour point corresponding to the starting key point and a second contour point corresponding to the final key point in the initial state contour, according to the correspondence;
determining a number of initial states of the contour points included in the initial state contour; and
taking a ratio of a serial number of the first contour point to the number of initial states as the starting contour position, and taking a ratio of a serial number of the second contour point to the number of initial states as the final contour position.

10. An image processing apparatus, comprising:
a recognizing module, configured to recognize a target contour of a target object in a target image collected at a current moment, wherein the target contour comprises a plurality of contour points;
a first determining module, configured to determine, in the target contour, a starting contour point corresponding to a starting contour position, a final contour point corresponding to a final contour position, and a split contour point corresponding to the current moment, according to a time difference between the current moment and a first moment, and according to the starting contour position and the final contour position determined at the first moment, wherein the first moment is a moment before the current moment;
a second determining module, configured to take a line segment composed of contour points between the starting contour point and the split contour point in the target contour as a first line segment, and take a line segment except the first line segment in the target contour as a second line segment; and
a rendering module, configured to render the first line segment according to a first color, and render the second line segment according to a second color, wherein the first color is different from the second color.

11. A non-transitory computer-readable medium, on which a computer program is stored, wherein, when executed by a processing apparatus, the program implements a method comprising:
recognizing a target contour of a target object in a target image collected at a current moment, wherein the target contour comprises a plurality of contour points;
determining, in the target contour, a starting contour point corresponding to a starting contour position, a final contour point corresponding to a final contour position, and a split contour point corresponding to the current moment, according to a time difference between the current moment and a first moment, and according to the starting contour position and the final contour position determined at the first moment, wherein the first moment is a moment before the current moment;

taking a line segment composed of contour points between the starting contour point and the split contour point in the target contour as a first line segment, and taking a line segment except the first line segment in the target contour as a second line segment; and rendering the first line segment according to a first color, and rendering the second line segment according to a second color, wherein the first color is different from the second color.

12. An electronic device, comprising:

a storage apparatus, on which a computer program is stored; and a processing apparatus, configured to execute the computer program in the storage apparatus, to implement steps of the method according to claim 1.

* * * * *